(12) United States Patent
Bohaychuk et al.

(10) Patent No.: US 10,012,327 B2
(45) Date of Patent: Jul. 3, 2018

(54) CAGE VALVE WITH INSTRUMENTATION

(71) Applicant: Master Flo Valve Inc., Edmonton (CA)

(72) Inventors: Larry J. Bohaychuk, Ardrossan (CA);
Douglas A. Finlayson, Spring, TX (US)

(73) Assignee: Master Flo Valve Inc., Edmonton (CA)

( * ) Notice: Subject to any disclaimer, the term of this patent is extended or adjusted under 35 U.S.C. 154(b) by 123 days.

(21) Appl. No.: 15/242,084

(22) Filed: Aug. 19, 2016

(65) Prior Publication Data

US 2017/0051845 A1    Feb. 23, 2017

Related U.S. Application Data

(60) Provisional application No. 62/208,459, filed on Aug. 21, 2015.

(51) Int. Cl.
| F16K 37/00 | (2006.01) |
| F16K 47/08 | (2006.01) |
| F16K 11/07 | (2006.01) |
| F16K 27/04 | (2006.01) |
| F16K 25/04 | (2006.01) |

(Continued)

(52) U.S. Cl.
CPC ............. F16K 47/08 (2013.01); E21B 34/02 (2013.01); F16K 11/0716 (2013.01); F16K 25/005 (2013.01); F16K 25/04 (2013.01); F16K 27/041 (2013.01); F16K 37/005 (2013.01); F16K 37/0041 (2013.01)

(58) Field of Classification Search
CPC ......... Y10T 137/8242; Y10T 137/8326; E21B 33/035; F16K 25/005; F16K 11/0716; F16K 47/08; F16K 25/04
See application file for complete search history.

(56) References Cited

U.S. PATENT DOCUMENTS

| 4,136,709 A | 1/1979 | Rogers et al. |
| 4,540,022 A | 9/1985 | Cove |

(Continued)

FOREIGN PATENT DOCUMENTS

GB      2182120      5/1987

OTHER PUBLICATIONS

UK Search Report for GB Patent Application 1614160.8, dated Nov. 28, 2016 in Applicant's corresponding UK Application (status pending, examination requested Mar. 8, 2017).

*Primary Examiner* — Craig Schneider
*Assistant Examiner* — Angelisa L Hicks
(74) *Attorney, Agent, or Firm* — Leydig, Voit & Mayer, Ltd.

(57) ABSTRACT

A cage valve, flow trim components, and method for signalling erosion of flow trim. The valve is of the type having flow trim arranged across an inlet bore and aligned with an outlet bore, and including a stationary tubular cage and an internal or external flow control member such as a plug or flow collar slidable along the side wall of the cage to cover or uncover flow ports in the side wall. The flow control member includes an end plate which closes an upstream end of the cage. A cavity is formed in the flow control member upstream of the end plate. A transmitter, such as a proximity beacon, positioned in the cavity transmits a first signal indicative of intact flow trim when no fluid is in the beacon cavity and transmits a zero value signal or no signal indicative of eroded flow trim when fluid enters the cavity.

34 Claims, 3 Drawing Sheets

(51) Int. Cl.
*F16K 25/00* (2006.01)
*E21B 34/02* (2006.01)

(56) References Cited

U.S. PATENT DOCUMENTS

| | | |
|---|---|---|
| 4,638,833 A | 1/1987 | Wolcott, II |
| 5,170,659 A | 12/1992 | Kemp |
| 5,431,188 A | 7/1995 | Cove |
| 5,797,428 A | 8/1998 | Miller |
| 6,105,614 A | 8/2000 | Bohaychuk et al. |
| 6,782,949 B2 | 8/2004 | Cove et al. |
| 6,814,104 B2 * | 11/2004 | Dean .................. F15B 13/0402 137/557 |
| 7,426,938 B2 | 9/2008 | Bohaychuk et al. |
| 8,371,333 B2 | 2/2013 | Bohaychuk et al. |
| 9,080,438 B1 | 7/2015 | McCoy et al. |
| 9,511,829 B2 | 12/2016 | Gordon et al. |
| 2003/0141072 A1 | 7/2003 | Cove et al. |
| 2004/0107767 A1 * | 6/2004 | Johnson .................... F16K 1/38 73/46 |
| 2005/0115619 A1 * | 6/2005 | Kawulka ............. E21B 33/0355 137/625.33 |
| 2006/0163517 A1 | 7/2006 | Bohaychuk et al. |
| 2010/0288389 A1 | 11/2010 | Hopper et al. |

\* cited by examiner

CAGE VALVE WITH INSTRUMENTATION

CROSS-REFERENCE TO RELATED APPLICATIONS

This application is a U.S. Nonprovisional application filed under 35 U.S.C. § 111(a) which claims the benefit of U.S. Application No. 62/208,459, filed Aug. 21, 2015. This application is hereby incorporated by reference in its entirety.

FIELD OF THE INVENTION

This invention relates to a cage valve with instrumentation to signal erosion, a method of signalling erosion in a cage valve, and flow trim components of a cage valve to signal erosion.

BACKGROUND

A choke valve is a throttling device commonly used as part of an oil or gas field wellhead. It functions to reduce the pressure of the fluid flowing through the valve. Choke valves are placed on the production "tree" or "manifold" of an oil or gas wellhead assembly to control the flow of produced fluid from a reservoir into the production flow line, and is used on wellheads or manifolds located on land, offshore, or beneath the surface sub-sea of the ocean (sub-sea). Examples of choke valves used in oil and gas fields are generally described in U.S. Pat. No. 4,540,022, issued Sep. 10, 1985, to Cove and U.S. Pat. No. 5,431,188, issued Jul. 11, 1995, to Cove. Both patents are commonly owned by the applicant of this application, Master Flo Valve, Inc.

In general, choke valves include:

a valve body having an axial main bore, a body inlet (extending along an inlet bore, typically oriented as a side outlet to the axial main bore) and a body outlet (extending along an outlet bore, usually aligned with the axial main bore);

a "flow trim" mounted in the main bore between inlet and outlet, for throttling the fluid flow moving through the body; and biasing members such as a stem and bonnet assembly for actuating the flow trim to open and close the choke valve, and for closing the upper end of the axial main bore remote from the outlet.

There are four main types of flow trim commonly used in commercial chokes or control valves, each of which includes a port-defining member forming one or more flow ports, a movable flow control member for throttling the flow ports, and seals to implement a total shut-off. These four types of flow trim can be characterized as follows:

(1) a needle and seat flow trim comprising a tapered annular seat fixed in the valve body and a movable tapered internal plug for throttling and sealing in conjunction with the seat surface;

(2) a multiple-port disc flow trim, having a fixed ported disc mounted in the valve body and a rotatable ported disc, contiguous therewith, that can be turned to cause the two sets of ports to move into or out of register, for throttling and shut-off;

(3) a cage with internal plug flow trim, comprising a tubular, stationary cylindrical cage, fixed in the valve body and having ports in its side wall, and an internal plug movable axially through the bore of the cage to open or close the ports. Shut-off is generally accomplished with a taper on the leading edge of the plug, which seats on a taper carried by the cage or body downstream of the ports; and (4) a cage with external sleeve flow trim, comprising a tubular, stationary cylindrical cage having ports in its side wall and a hollow cylindrical external sleeve (also termed external flow collar) that slides axially over the cage to open and close the ports. The shut-off is accomplished with the leading edge of the sleeve contacting an annular seat carried by the valve body or cage.

In each of the above, the flow trim is positioned within the choke valve at the intersection of the valve's inlet and outlet. In the latter two types of valves, termed "cage valves", the flow trim includes the tubular, stationary cylinder referred to as a "cage", positioned transverse to the inlet and having its bore axially aligned with the outlet. The cage has one or more restrictive flow ports extending through its side wall. For cage valves, flow through the ports of the cage is controlled by a flow control member which is either an internal plug component, or an external sleeve/flow collar component. Fluid enters the cage from the choke valve inlet, passes through the flow ports and changes direction to leave the cage bore through the valve outlet.

The valve body is formed of softer material, typically steel, while the flow trim components are typically manufactured from a hardened, high wear material such as tungsten carbide. The steel body is machined in the course of fabrication and must cope with stresses, and thus is manufactured from a relatively ductile steel. The flow trim however has harder surfaces. Typically the cage of the flow trim is formed of tungsten carbide, the internal plug is formed of tungsten carbide, and a tungsten carbide liner is shrink-fitted as a liner in flow collar. This is important because the flow trim is positioned at the bend of the "L", where it is exposed to, and temporarily contains, the fluid flow when it is accelerated, is changing direction, and is in a turbulent state. Erosion of the flow trim may be extreme, causing catastrophic failure of the choke valve, which results in over pressurization of the downstream equipment or damage to the well formation due to excessive flow.

Production interruptions occur with surface and sub-sea facilities when there is erosion (i.e., wear) of the valve flow trim to the point that the flow trim needs to be replaced. It is important to replace the flow trim before damage to other valve internals or the valve body is allowed to occur. Depending on the application and choke operation conditions, erosion can occur in different locations of the flow trim, including the cage ports, the outlet end of the cage, the flow collar liner or the upstream end of the plug (i.e., opposite or facing the outlet). Wear detection and signalling to notify of flow trim wear, while needed, is an inexact technology for many reasons. Wear of the flow trim occurs at different locations and to different degrees, depending on the application and choke operating conditions. Most areas of the flow trim such as the ports, the plug or the flow collar are not accessible and/or hospitable locations for sensors or transmitters to be inserted. As well, once erosion starts to occur, the rate of erosion may accelerate to the point that the flow trim, and thus the choke, can fail in a very short period of time.

There is thus still a need for erosion monitoring for choke valves of the cage valve types. Examples of cage valves with external flow collar are shown in, for instance, U.S. Pat. No. 4,540,022, issued Sep. 10, 1985, to Cove et al., U.S. Pat. No. 6,105,614, issued Aug. 22, 2000 to Bohaychuk et al., and U.S. Pat. No. 7,426,938, issued Sep. 23, 2008 to Bohaychuk et al. A choke valve including an external flow collar flow trim in sub-sea applications is shown in U.S. Pat. No.

6,782,949 to Cove et al. These patents describe the beneficial characteristics of the external sleeve/flow collar design in erosion control, valve outlet erosion protection, seating integrity, and fluid energy control features. An exemplary choke valve including an internal plug flow trim component is shown in US Patent Publication No. 2010/0288389 A1 to Hopper et al., and assigned to Cameron International Corporation.

FIG. 1 shows a typical prior art choke valve in which the flow trim includes an external tubular throttling sleeve (flow collar) that slides externally over the side wall of the cage. The sleeve acts to reduce or increase the area of the flow ports. An actuator, such as a threaded stem assembly, is provided to bias the sleeve back and forth along the cage. The rate that fluid passes through the flow trim is dependent on the relative position of the flow collar on the cage and the amount of port area that is revealed by the sleeve.

In sub-sea wellheads, maintenance cannot be performed manually. An unmanned, remotely operated vehicle, referred to as an "ROV", is used to approach the wellhead and carry out maintenance functions. To aid in servicing sub-sea choke valves, such choke valves have their internal components, including the flow trim, assembled into a modular sub-assembly. The sub-assembly is referred to as an "insert assembly" and is inserted into the choke valve body and clamped into position. FIG. 2 shows a typical prior art sub-sea choke valve with flow trim of the external throttling sleeve (flow collar) type.

SUMMARY OF THE INVENTION

In some embodiments, there is provided a valve having a fluid flow path extending between an inlet and an outlet, and which is to be restricted or closed, including a hollow valve body assembly configured with an inlet bore and an outlet bore which intersect at a main bore, the main bore being open at an upper end and providing fluid communication between the inlet bore and the outlet bore, and a flow trim positioned in the main bore. The flow trim includes a stationary tubular cage and a flow control member. The cage has a side wall, the side wall of the cage forming an internal bore aligned with the outlet bore and having a ported portion between its ends formed with one or more flow ports. The flow control member closes the cage at an upstream end opposite the outlet and is adapted for sliding movement along the side wall of the cage, either internal the cage or external the cage. The flow control member is adapted for movement between a closed position, wherein the one or more flow ports are fully covered by the flow control member, and an open position, wherein each of the one or more flow ports is fully or partially uncovered by the flow control member, whereby fluid may enter the valve through the inlet, continue through the inlet bore, pass through the one or more flow ports at reduced pressure, continue through the outlet bore and exit by the outlet. The valve also includes a bonnet disengagably connected with, and closing, the upper end of the main bore and a stem for biassing the flow control member over the one or more flow ports between the open and closed positions. The flow control member has an end plate positioned to close the cage at the upstream end, and forms a cavity upstream of the end plate such the end plate prevents fluid communication between the cage and the cavity until erosion at a central wear portion of the end plate caused from turbulent flow of fluid in the cage wears through the end plate to permit fluid from the cage to enter the cavity. A transmitter is positioned in the cavity to transmit a first signal indicative of intact flow trim when there is no fluid in the cavity and to transmit a second signal indicative of eroded flow trim when fluid enters the cavity.

Also broadly provided is a method of signalling erosion of a flow trim in a cage valve, wherein the cage valve has an inlet, an outlet, an inlet bore and an outlet bore, with the flow trim positioned in a main bore at an intersection of the inlet bore and the outlet bore, the flow trim including a stationary tubular cage and a flow control member sliding internally or externally of the cage over one or more ports formed in a side wall of the cage to control fluid flow through the cage valve. The method includes:

providing an end plate on the flow control member such that the end plate closes the upstream end of a cage opposite the outlet;

providing a cavity in the flow control member upstream of the end plate such that the end plate prevents fluid communication between the cage and the cavity until erosion at a central wear portion of the end plate caused by turbulent flow of fluid entering the cage wears through the end plate to permit fluid from the cage to enter the cavity; and providing a transmitter in the cavity to transmit a first signal indicative of intact flow trim when there is no fluid in the cavity and to transmit a second signal indicative of eroded flow trim when fluid enters the cavity.

Also provided are components of the valve adapted for signalling erosion, including the flow trim components and the retrievable valve components adapted as a removable insert assembly for sub-sea applications.

DETAILED DESCRIPTION

The flow trim and cage components described herein have wide application in cage valves in which the flow trim includes a stationary ported cage component and a flow control member which slides externally or internally along the side wall of the cage to cover and uncover the port(s) in the cage. The flow trim and cage components described herein have particular application in choke valves and control valves of the external sleeve (flow collar) and inner cage valve design. Two exemplary types of external sleeve/ inner cage valves are shown and described in FIGS. 1-3 herein to illustrate the invention, but the invention has wider application. For example, the cage component may be adapted for use with other known external sleeve inner cage valves, for example cage valves in which the cage component is fitted at or into the outlet of the valve, for example by threading. The cage component may be adapted for use in external sleeve/inner cage valves in which the cage component is multi-ported, with a plurality of flow ports (same or differently sized) arranged circumferentially around the ported portion of the cage component. As well, the flow trim components of this invention may be modified for a cage valve of the internal plug design, wherein the external flow collar is replaced by an internal plug. In the description which follows, the cage component is described as being adapted for flow trim of the type shown in Figures, however, this description is illustrative only, and the claims which follow should not be interpreted as being limited to this valve type or design.

Figure 1:
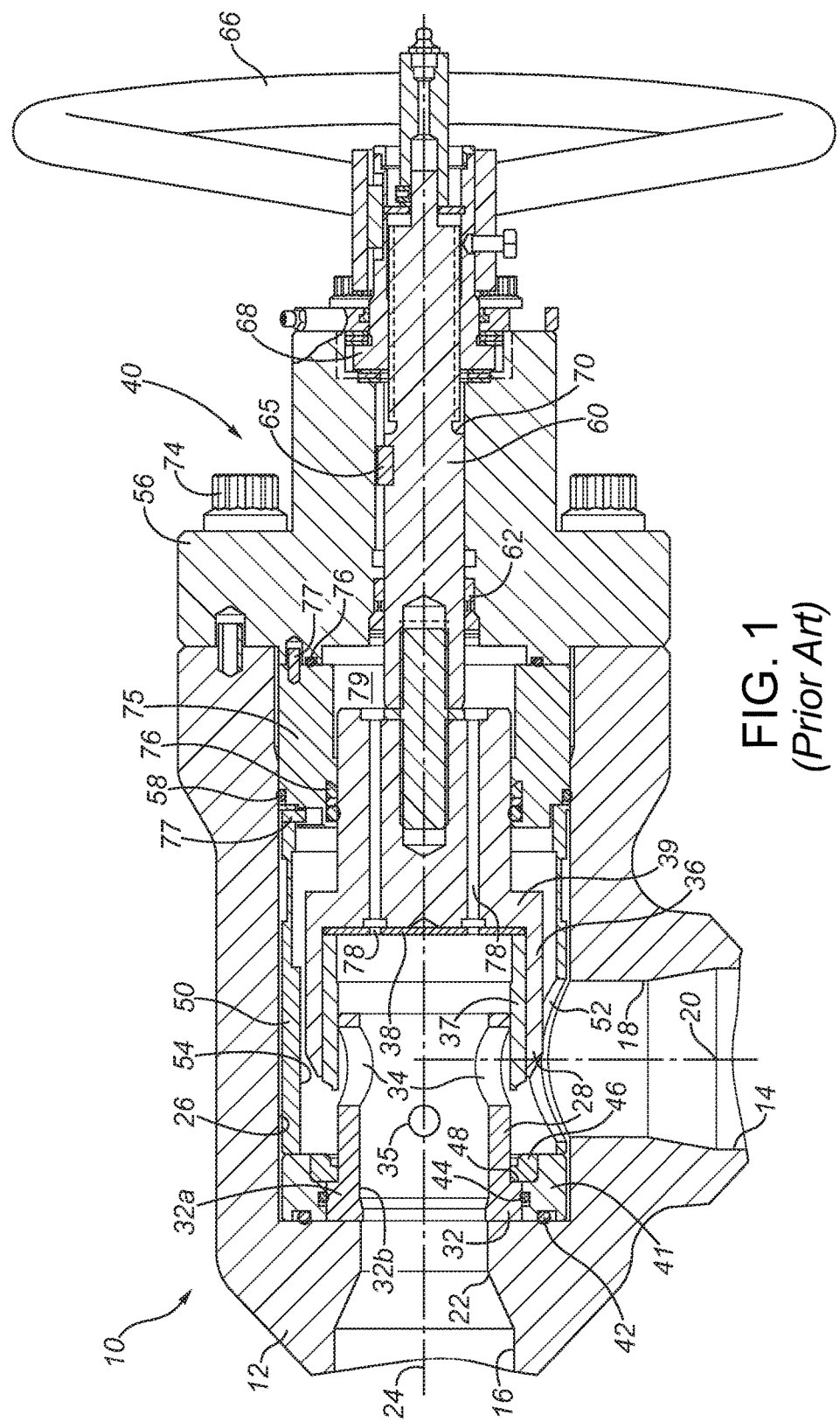
FIG. 1 is a side sectional view of a choke valve of the prior art for use as a surface choke valve, and showing the external flow collar of the flow trim in the partially open position wherein the main flow ports of the inner tubular cage component are partially uncovered. The valve body is partially cut away at the inlet bore and outlet bore to better illustrate the valve internals.
Figure 2:
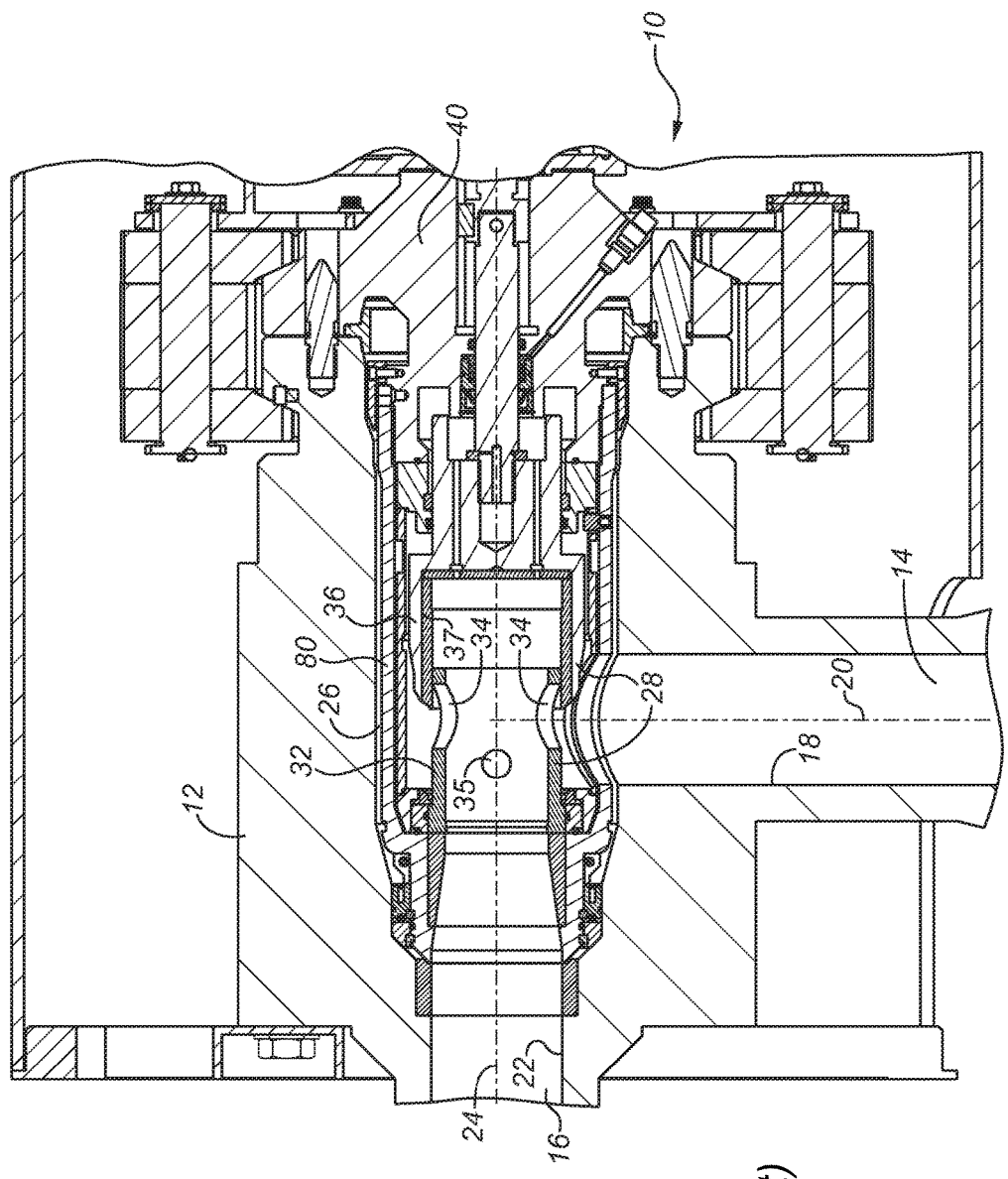
FIG. 2 is a side sectional view of another prior art choke valve with flow trim of the external sleeve internal cage design, but designed for a sub-sea wellhead. In sub-sea wellheads, maintenance cannot be performed manually. An unmanned, remotely operated vehicle, referred to as an "ROV", is used to approach the wellhead and carry out maintenance functions. To aid in servicing sub-sea choke valves, such choke valves have their internal components, including the flow trim, assembled into a modular sub-assembly. The sub-assembly is referred to as an "insert assembly" and is inserted into the choke valve body and clamped into position. The valve is shown in a partially cut away view to better illustrate the valve internals.

Each of FIGS. 1 and 2 show a choke valve which is a cage valve of a external sleeve inner cage valve design. The valve is generally shown at 10, and includes a hollow valve body 12, a body side inlet 14 and a body outlet 16. The hollow valve body 12 forms a bore which extends therethrough providing side inlet bore 18 having an inlet bore axis 20 (centre axis), a bottom outlet bore 22 having outlet bore axis 24 (centre axis). The side inlet bore 18 and the bottom outlet bore 22 intersect at a right angle (i.e., are generally T-shaped), forming a main bore 26 at the intersection. The main bore 26 is an extension of the bottom outlet bore 22, but also communicates with the side inlet bore 18. The flow trim 28 is located within the main bore 26, and at an intersection of the inlet and outlet bores 18, 20. In some embodiments, such as in control valves, the inlet and/or outlet bore may have a central axis which is not in a straight line, however, the intersection of the inlet and outlet axis is substantially at a right angle within the main bore 26 and within the flow trim 28. FIG. 2 shows a somewhat similar valve designed for sub-sea applications, with a removable insert assembly for remote controlled maintenance. While the main valve parts are common to the valves of both FIGS. 1 and 2, the description below describes the valve of FIG. 1 in greater detail.

While the angle of intersection between the inlet and outlet bores 18, 20 within the main bore 26 and within the flow trim 28 is shown as a right angle in FIGS. 1 and 2, it should be understood that the intersection could be at a different angle, provided the fluid changes directions through an angle as it moves through the flow trim 28. Thus, the term "substantially at a right angle" as used herein and in the claims, is meant to include an intersection of the inlet and outlet bores within the main bore and within the flow trim at a range of angles which may depart somewhat from a strict 90 degree angle.

Flow trim components 28 are shown to be located in the main bore 26, including a stationary cage component 32 (herein termed cage) which is tubular and substantially open-ended, and an external throttling cylindrical sleeve (herein also termed flow collar) 36 adapted to slide along the outer side wall of the upstream end of the cage 32. The external flow collar 36 is closed at its upper end (upstream end, opposite the outlet bore 18) by an end plate 38. Typically, the flow collar 36 includes a steel exterior collar 39 into which is press fit an inner liner 37, including end plate 38, formed of hardened, erosion resistant material, such as tungsten carbide. The cage 32 has a side wall 32a which forms an internal bore 32b that communicates with, and is substantially aligned with, the outlet bore 22. The side wall 32b of the cage 32 also forms one or more flow ports, shown as being arranged as at least a pair of diametrically opposed main flow ports 34. Alternatively, as noted above, a plurality of circumferentially spaced flow ports may be present. Still further alternatively, a multiport cage with a plurality of ports, for example 16 ports, spaced around the ported area of the cage, may be provided. The cage side wall 32a may also be formed with at least a pair of diametrically opposed smaller, secondary flow ports 35. The secondary flow ports 35 have a smaller diameter than that of the main flow ports 34, and are positioned with their axis (i.e., an axis through the midpoint of the ports) rotated or offset by 90° from the axis of the main flow ports 34. The secondary ports 35 are positioned closer to the body outlet 16 than are the main flow ports 34. The main flow ports 34, being larger in diameter, collectively accommodate a majority (i.e., more than 50%) of the fluid flow from the inlet 14. Preferably, the main flow ports 34 are arranged as diametrically opposed pairs, such as 1, 2 or 3 pairs. The main flow ports 34 may be circumferentially spaced and circumferentially aligned on the cage 32 (i.e., the midpoints of the ports 34 are equally spaced in a circle around the circumference of the cage 32). As well, the main flow ports may be located to overlap the intersection of the centre axes 20, 24 of the body side inlet bore 18 and the body outlet bore 22. As well, at least one pair of the one or more pairs of the diametrically opposed main flow ports 34 may be arranged such that a line through a midpoint of the diametrically opposed main flow ports 22 is parallel to a centre axis 20 of the inlet bore 18.

The flow collar 36 is connected to a stem/bonnet assembly 40 for closing the upper end of the valve body 12 (i.e., the end opposite the outlet 16) and for advancing or withdrawing the flow collar 36 to slide across the ports 34, 35 to close them or open them as described below. The flow trim components 28 are preferably made of an erosion resistant hard material such as tungsten carbide. In FIG. 1, the cage 32 is shown as known in the prior art, for example a unitary item formed from tungsten carbide material. However, the cage 32 may be formed with tubular inner and outer cage members bonded together at an interface, as described in U.S. Pat. No. 8,490,652 to Bohaychuk et al., issued Jul. 23, 2013.

The main bore 26 is formed to be larger in diameter than the outlet bore 22 to accommodate, seat and seal the flow trim components 28 therein. A cylindrical seat member 41 is positioned at the lower end of the main bore 26. The seat member 41 is sealed to the valve body 12 in the main bore 26 with seat seal 42, and to the cage 32 with cage seal 44. The stationary cage 32 is held at its lower end within the inner diameter of the seat member 41. A seat insert member 46 is seated in the inside diameter of seat member 41. This seat insert member 46 is preferably formed of erosion resistant material such as tungsten carbide and serves multiple purposes. The seat insert member 46 protrudes inwardly to the cage 32 above a widened retaining shoulder 48 of the cage 32, thereby retaining the cage 32 within the main bore 26. As well, the seat insert member 46 forms a seat for the flow collar 36, when the flow collar 36 is in the fully closed position covering the main and secondary flow ports 34, 35. A tubular retaining sleeve 50 is preferably positioned in the main bore 26 between the seat member 41 and the bonnet 56, with the flow trim 28 positioned within the retaining sleeve 50. The retaining sleeve 50 extends transversely over the inlet bore 18, and has a central bore 54 aligned with the outlet axis 24. The sleeve 50 includes at least one sleeve side port 52 into the sleeve bore 54, the side port 52 preferably being aligned with the inlet bore 18. In some embodiments, the sleeve side port 52 and main flow ports 34 may be offset relative to the inlet bore 18 for fracture prevention from debris moving down the inlet, as is described in U.S. Pat. No. 7,426,938 to Bohaychuk et al. In some embodiments, the tubular retaining sleeve 50 may be omitted and the cage component may be held at or within the outlet bore 22, for example by threading.

The stem/bonnet assembly 40 is shown to include a stationary bonnet member 56 extending into the main bore 26, and carrying bonnet-body seal components 58. Housed within the bonnet member 56 is threaded stem member 60. The stem 60 and bonnet 56 are sealed through stem-bonnet seal components 62. The stem 60 is designed for axial movement, the result of rotational movement of the upper stem nut assembly 68 on an upper threaded section of the stem 60, initiated for example by rotating the handle assembly 66 at its upper end. The stem 60 is connected or fastened to the flow collar 36 at its lower end in a known manner to impart translational movement to the flow collar 36 for opening and closing the valve 10. Key member 65, positioned between the stem 60 and the bonnet 56, prevents rotational movement of stem 60 within the bonnet 56, while permitting translational movement to be imparted to the flow collar 36. The upward movement of the stem 60, and thus the flow collar 36, is limited when stem shoulder 70 contacts the stem nut 68. Alternate stem stop mechanisms may be used to limit upward stem movement to prevent fully uncovering the main flow ports 34, as described in U.S. Pat. No. 8,371,333, issued Feb. 12, 2013, to Bohaychuk. The bonnet 56 closes the upper end of the main bore 26. The bonnet 56 is bolted to the valve body 12. Alternate mechanisms for closing the valve body 12, and for actuating the flow collar 36 for translational movement are well known in the art, such as hydraulic actuators and stepping actuators.

The particular valve shown in FIG. 1 is pressure balanced, including a cylindrical balance sleeve 75 sealed in the main bore 26 between the valve body 12 and the upstream end of the flow collar 39 with seal components 58, 76, and pinned at its ends with pins 77. One or more pairs of balance ports 78, for example four balance ports, extend through the end plate 38 and through the upstream end of the exterior collar 39 to a balance chamber 79 to reduce the stem load during opening and closing of the valve.

The choke valve 10 may optionally include inwardly extending protuberances on the tubular sleeve 50 or the choke body 12 to deflect flow toward the main flow ports 34 of the cage 32, as described in U.S. Pat. No. 7,426,938 and U.S. Pat. No. 6,105,614, both to Bohaychuk et al.

As shown in FIG. 2, the flow trim and stem/bonnet assembly may be positioned as an insert assembly wherein the flow trim 28 is held within a removable tubular cartridge 80 in the main bore for sub-sea applications, such as shown in prior art including U.S. Pat. No. 7,426,938 to Bohaychuk et al. or U.S. Pat. No. 4,540,022 to Cove. A prior art valve of this type is shown in FIG. 2, with like parts being labelled with similar reference numerals as used in FIG. 1.

The flow trim components including the cage 32, the flow collar liner 37, and the end plate 38, are formed from hardened, wear resistant materials such as tungsten carbide materials or other hard, wear resistant ceramics.

While the tubular cage 32 is shown in the Figures as having a generally constant diameter internal bore, it should be understood that the internal bore might be tapered or alternatively shaped in some applications.

Figure 3:
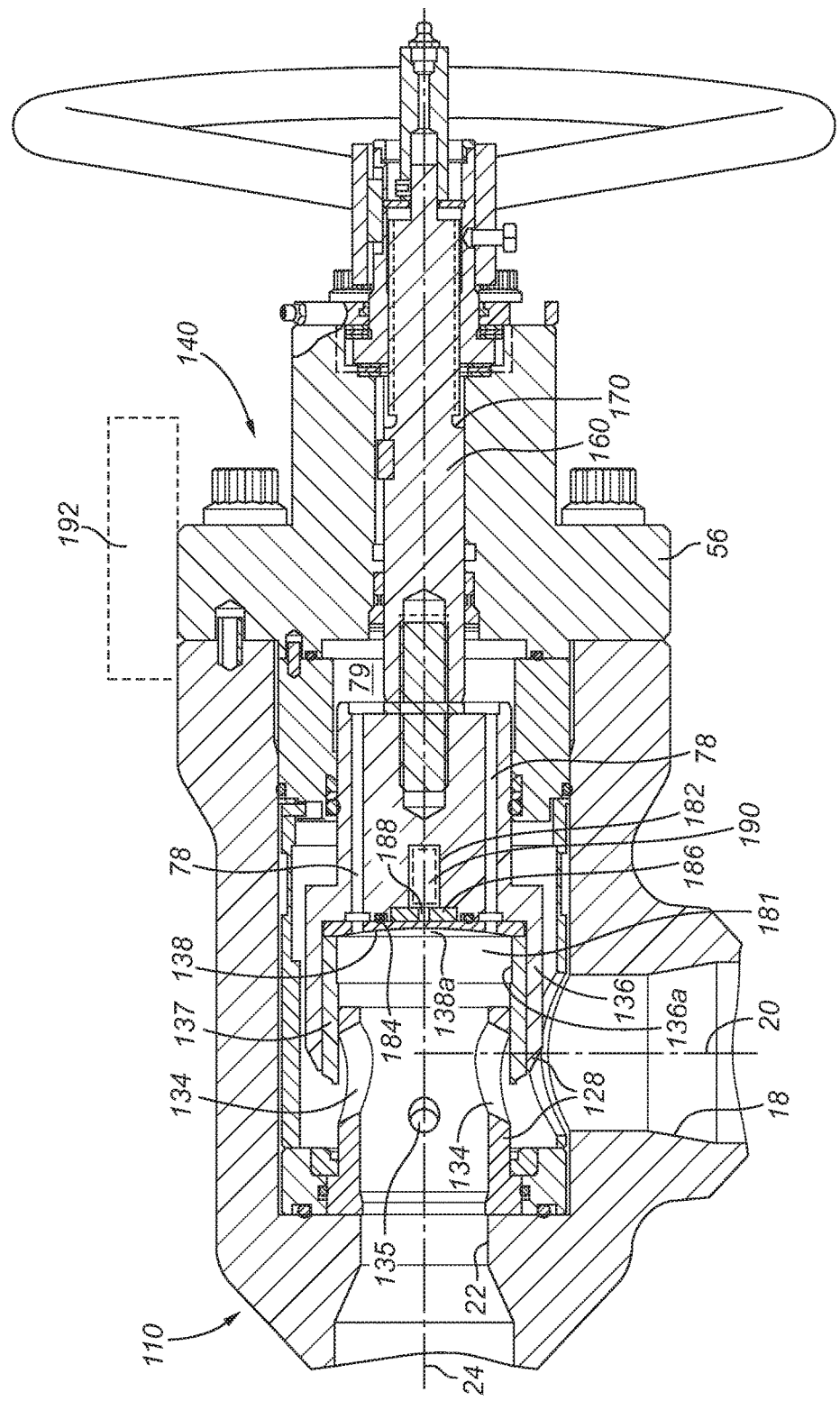
FIG. 3 is a side sectional view of a choke valve of a type similar to that of FIG. 1, but showing an embodiment of the present invention wherein flow trim components are adapted for signalling erosion of the flow trim.

Turning to FIG. 3, a valve 110 of the type shown in FIG. 1 is shown, but including valve instrumentation according to one embodiment of the present invention. In FIG. 3, like or similar parts are either not labelled or are labelled with the same reference numerals as used for FIG. 1. Some parts in FIG. 3 are labelled with reference numerals which are increased by 100 compared to FIG. 1.

The end plate 138 of the flow trim in FIG. 3 is shown to be modified, compared to the end plate 38 of FIG. 1, such that wear and erosion caused by turbulent flow in the flow trim 128 occurs preferentially at a central wear portion 138a of the end plate 138. The external flow collar 136 forms an internal bore 136a which is closed at an upstream end (i.e., at the bonnet end, and opposite the outlet 16 and the outlet bore 22) by the end plate 138. A flow collar chamber 181 is formed in the bore 136a at the upstream portion of the flow collar 136. In one embodiment, as shown in FIG. 3, the end plate 138 has a reduced thickness at the central wear portion 138a, for example by forming the end plate 138 with a concave surface facing the flow collar chamber 181, with the reduced thickness portion located at the central wear portion 138a. The flow collar 136 forms a transmitter cavity 182 upstream of the end plate 138, i.e., toward the bonnet 56, and opposite the outlet bore 22). The cavity 182 is aligned with the central wear portion 138a of the end plate 138, which in turn is generally aligned with the central axis 24 of the outlet bore 22. The end plate 138 prevents fluid communication between the flow collar chamber 181 and the cavity 182 until erosion at a central wear portion 138a of the end plate 138 caused from turbulent flow of fluid in the flow collar chamber 181 wears through the end plate 138 to permit fluid from the flow collar chamber 181 to enter the cavity 182.

In some embodiments, the end plate 138 may be formed from a material which is less hardened and/or less wear resistant than other components of the flow trim 128, so as to preferentially wear at the central wear portion 138a, before other components of the flow trim 128. For instance, the end plate 138 may be formed from a grade of tungsten carbide with lower wear resistance and lower hardness than that of the cage 132 and liner 137 components. In such embodiments, the end plate 138 does not necessarily include the reduced thickness portion, although inclusion of the reduced thickness portion can improve preferential wear at the central wear portion 138a.

In some embodiments, the transmitter cavity 182 may be lined with a wear resistant material such as tungsten carbide to delay erosion of the flow collar components surrounding the beacon chamber 182.

In some embodiments, the transmitter cavity 182 may extend from the end plate 138 further upstream of the end plate 138 toward the bonnet 56, for example through the stem member 160, through a conduit formed in the stem member 160, or even completely through the stem/bonnet assembly 140 to terminate external of the valve 110. This may be advantageous for minimizing signal interference, for example from the steel body of valve 110.

In FIG. 3, the particular choke valve 110 is of a balanced type, with balance ports 78 extending through the end plate 138 and through the upstream end of the exterior collar 136 to the balance chamber 79. Seals 184 are provided on the upstream side of the end plate 138 between the ports 78 and the cavity 182 to isolate the cavity 182.

In some embodiments, the central wear portion 138a of the end plate 138, such as the concave and reduced thickness portion of the end plate 138, is reinforced with a back plate 186. The back plate 186 delays the time for fluid to erode through the central wear portion 138a of the end plate 138, to ensure that the preferential wear at this location is not too rapid. The back plate 186 is positioned between the end plate 138 and the cavity 182 at the reduced thickness portion. The back plate 186 is formed with an aperture 188 aligned with the centre axis of the outlet bore 22 to permit fluid from the flow collar chamber 181 to enter the cavity 182 through the eroded reduced thickness portion of the end plate 138 and through the aperture 188 of the back plate 186.

To further improve preferential wear at the end plate 138, some or all of the one or more flow ports, i.e., the main flow ports 134 and preferably any secondary flow ports 135, of the cage are formed at an angle relative to a centre axis 20 of the inlet bore 18 such that the flow from the inlet bore 18 is directed angularly into the flow collar chamber 181 and away from the outlet bore 22 to encourage wear at the reduced thickness portion of the end plate 138 and to reduce erosion of components at the outlet bore 22. In some embodiments, the angle is between about 10 and 60 degrees from the centre axis 20 of the inlet bore 18, however the angle for the main flow ports 134 may differ from the angle of the secondary flow ports 135. In other embodiments the angle is between about 10 and 45 degrees, and in still further embodiments, the angle is between about 15 and 25 degrees. If the valve 110 is of a multiport type, such as with 16 ports (more or less) spaced around the ported area of the cage, some or all of the ports may be angled to direct flow into the flow collar chamber 181, particularly the ports located most proximate the flow collar chamber 181.

Alternatively, to improve preferential wear at the end plate 138, and to lessen wear at the outlet end of the cage 132, as disclosed in above-mentioned U.S. Pat. No. 8,371,333, the flow collar 136 may be located for limited movement between the fully closed position wherein each of the main flow ports 134 is fully covered by the external flow collar 136 and a fully open position, wherein each of the main flow ports 134 remains partially covered, for example between about 5% and 15%, such as between 8% and 10% of the diameter of each of the main flow ports 134 remains covered, by the external flow collar 136 such that fluid flow from the inlet bore 18 through each of the main flow ports 134 is directed angularly into the flow collar chamber 181 of the external flow collar 136, away from the outlet bore 22. To limit the movement of the external flow collar 136 such that each of the main flow ports 134 remains partially covered by the flow collar 136 in the fully open position, the valve 110 may include one or more of the following arrangements:

i) each of the main flow ports 134 being located or sized on the cage 132 such that each of the main flow ports 134 remains partially covered by the flow collar 136 in the fully open position;

ii) the cage 132 being located relative to the external flow collar 136 such that each of the main flow ports 134 remains partially covered in the fully open position;

iii) the external flow collar 136 being located or sized relative to the cage 132 and each of the main flow ports 134 such that each of the main flow ports 134 remains partially covered in the fully open position; and iv) a stop mechanism, such as a stop shoulder 170, to limit the travel of the stem 160 and the external flow collar 136 such that each of the main flow ports 134 remains partially covered in the fully open position.

A transmitter 190 is positioned in the transmitter cavity 182, for example by fastening to the cavity wall, to transmit a first signal indicative of intact flow trim when there is no fluid in the cavity 182 and to transmit a second signal indicative of eroded flow trim when fluid enters the cavity 182. It will be understood that the transmitter functions such that there is a detectable difference between the first signal and the second signal, whether that difference is in a parameter of the signal, a discontinuity between the signals, or one of the first or second signals becoming a zero signal (i.e., no signal is transmitted). Thus, in some embodiments the second signal may be a signal having a parameter, for example frequency, different from the first signal. In some embodiments, the second signal may have a data component modulated in the signal such that the second signal differs from the first signal. In some embodiments, the first signal may be a zero value signal (i.e., no signal), followed by a second signal which is a non-zero value signal. In some embodiments, the second signal may be a zero value signal (i.e., no signal) and the first signal is a non-zero value signal. In some embodiments there may be discontinuity between the first signal and the second signal, such as in signal strength or frequency. The difference between the first and second signal will vary with the type of transmitter 190, as set out below.

In one exemplary embodiment, the transmitter 190 is a proximity beacon, for example a KONTAKT™ Tough Beacon, which is a battery operating proximity beacon operating with BLUETOOTH™ technology to deliver location aware context aware messages. The high pressure and turbulent flow as fluid enters the cavity 182 from the flow collar chamber 181 is sufficient to collapse a transmitter of the proximity beacon type in a short time period such that the beacon shorts out and a zero value signal (i.e., no signal) is transmitted as the second signal. In this manner, the transmitter 190 operates to send a regular "heartbeat" first signal until fluid enters the cavity, and then sends no signal once the transmitter 190 is collapsed or shorted out.

In general, the transmitter 190 may be a beacon or sensor capable of transmitting or broadcasting a signal using a relevant part of the electromagnetic spectrum, such as radio frequency. In some embodiments the transmitter 190 may be a proximity beacon, such as a low-powered transmitter equipped with Bluetooth™ or WiFi that can transmit a wireless UHF RF signal be picked up by a transceiver 192 in close proximity to the transmitter 190. The proximity beacon 190 should have suitable battery capability and operate in a broad temperature range to manage the temperature ranges typically experienced at a wellhead. The beacon 190 shorts out once fluid and turbulent flow enters the beacon cavity 182 so that no signal is transmitted to indicate eroded flow trim. In other embodiments, the transmitter 190 may be a wired proximity beacon, with an electrical cable running through the stem/bonnet assembly 140, for example through the valve stem 160, to the transceiver 192. In other embodiments, the transmitter 190 may be a sensor transmitter (wired or wireless), such as a pressure sensor (ex. pressure transducer or pressure switching device) which detects pressure within the cavity 182 to transmit a first signal, which may be a zero value signal (i.e., no signal), a signal having a parameter such as frequency, or a signal modulated with a data component indicative of the pressure or lack of fluid in the transmitter cavity 182. Once fluid or elevated fluid pressure is detected in the transmitter cavity 182 due to eroded flow trim, the sensor transmits a second signal which differs from the first signal to the transceiver 192 indicating fluid, or increased pressure in the cavity 182 due to the eroded flow trim.

The transceiver 192 is positioned on or proximate the valve 110 to receive the first signal and second signals from the transmitter 190 and to create and to transmit a communication signal based on the received signals indicative of the state of the flow trim to an operator located proximate or remotely from the valve at an operator station such as may be equipped with a computer system. In some embodiments, the transceiver 192 may be a smart phone of an operator, and the transceiver may be equipped with an antenna for wireless transmission. In other embodiments the transceiver 192 is a radio transceiver which communicates within a wireless operating network at the wellsite, or transmits via satellite for delivery to a remote operator station. In some embodiments the transceiver 192 may be operative to detect the time between regular "heartbeat" signals from the transmitter 190, and transmit only when the time exceeds a threshold setting. In general, the transmitter 190 and transceiver 192 may be wired or wireless, and operate using established communication protocols, such as HART protocol, and may use known BLUETOOTH technology, or other comparable protocols and technologies. Data transmission is typically using RS485 standards. The transmitter 190 and transceiver 192 may be battery powered or powered by solar energy or other energy sources at wellsite. In other embodiments the transceiver 192 may be a data collection system which stores data generated from the first and second signals at the wellsite to be downloaded by an operator, remotely or by routine visits to the wellsite.

Other data may be stored, collected and/or transmitted from the transceiver 192, for example a serial number, a well identification number, a vibration signal, a GPS location signal, battery state or life of the transmitter 190 and/or transceiver 192. This may assist the remote operator in identifying the particular well or wellsite location to dispatch service to the wellhead in order to service or replace the eroded flow trim.

For the sub-sea environment, the transceiver 192 is generally adapted to transmit the communication signal to a remote station located at the sea surface through an umbilical or downloaded to an ROV to be uploaded at the surface.

In operation, the instrumented valve 110 as described above provides a method of signalling erosion of the flow trim component of a cage valve. The transmitter cavity 182 is provided in the external flow collar 136 (or in the plug if the cage valve is of the internal plug type) upstream of the end plate 138 such the end plate 138 prevents fluid communication between the flow collar chamber 181 and the cavity 182 until erosion at a central wear portion 138a of the end plate 138 caused from turbulent flow of fluid in the flow collar chamber 181 wears through the end plate 138 to permit fluid from the flow collar chamber 181 (or from the cage 132 in the embodiment of an internal plug) to enter the transmitter cavity 182. A transmitter 190 is provided in the transmitter cavity 182 to transmit a first signal indicative of intact flow trim when there is no fluid in the transmitter cavity 182 and to transmit a second signal indicative of eroded flow trim when fluid enters the transmitter cavity 182.

Components of the flow collar 136, apart from the liner 137, and other valve internals are typically fabricated from stainless steel, while the valve body 112 is machined from steel. The body and stainless steel components wear at a much elevated rate compared to wear resistant materials such as tungsten carbide used for the flow trim 128. Once the flow trim 128 has eroded to the point that fluid enters the transmitter cavity 182, the flow trim 128 can be replaced without significant delay, as signalled by the instrumented valve provided herein, before significant wear occurs to the other valve components or valve body.

As noted above, the flow trim 128 may be modified for a cage valve of the type in which the external flow collar, operating as a flow control member, is replaced by an internal plug. The end plate and cavity are formed in the plug component at an upstream end of the plug facing the outlet bore, and the one or more ports in the cage side wall may be angled as described above. Other components such as the transmitter and transceiver, are generally as described above.

All references mentioned in this specification are indicative of the level of skill in the art of this invention. All references are herein incorporated by reference in their entirety to the same extent as if each reference was specifically and individually indicated to be incorporated by reference. However, if any inconsistency arises between a cited reference and the present disclosure, the present disclosure takes precedence. Some references provided herein are incorporated by reference herein to provide details concerning the state of the art prior to the filing of this application, other references may be cited to provide additional or alternative device elements, additional or alternative materials, additional or alternative methods of analysis or application of the invention.

The terms and expressions used are, unless otherwise defined herein, used as terms of description and not limitation. There is no intention, in using such terms and expressions, of excluding equivalents of the features illustrated and described, it being recognized that the scope of the invention is defined and limited only by the claims which follow. Although the description herein contains many specifics, these should not be construed as limiting the scope of the invention, but as merely providing illustrations of some of the embodiments of the invention.

One of ordinary skill in the art will appreciate that elements and materials other than those specifically exemplified can be employed in the practice of the invention without resort to undue experimentation. All art-known functional equivalents, of any such elements and materials are intended to be included in this invention. The invention illustratively described herein suitably may be practised in the absence of any element or elements, limitation or limitations which is not specifically disclosed herein.

As used herein and in the claims, the words "comprising", "including" and "having" are used in a non-limiting sense to mean that items following the word in the sentence are included and that items not specifically mentioned are not excluded. The use of the article "a", "an", "the", and "said" in the claims before an element means that one of the elements is specified, but does not specifically exclude others of the elements being present, unless the context clearly requires that there be one and only one of the elements. As well, the use of "top", "bottom", "above", "below", "upper", "lower" and variations of these or other terms is made for convenience of description relative to component positioning in the drawings, with the choke valve oriented as shown in FIG. 3, but otherwise does not require only these particular orientations of the components.

The invention claimed is:

1. A valve having a fluid flow path extending between an inlet and an outlet, and which is to be restricted or closed, comprising:
   a hollow valve body assembly configured with an inlet bore and an outlet bore which intersect at a main bore, the main bore being open at an upper end and providing fluid communication between the inlet bore and the outlet bore;
   a flow trim positioned in the main bore, the flow trim comprising:
      a stationary tubular cage having a side wall, the side wall of the cage forming an internal bore aligned with the outlet bore and having a ported portion between its ends formed with one or more flow ports; and a flow control member closing the cage at an upstream end opposite the outlet and being adapted for sliding movement along the side wall of the cage, either internal the cage or external the cage, the flow control member being adapted for movement between a closed position, wherein the one or more flow ports are fully covered by the flow control member, and an open position, wherein each of the one or more flow ports is fully or partially uncovered by the flow control member, whereby fluid may enter the valve through the inlet, continue through the inlet bore, pass through the one or more flow ports at reduced pressure, continue through the outlet bore and exit by the outlet;

a bonnet disengagably connected with, and closing, the upper end of the main bore;

a stem for biassing the flow control member over the one or more flow ports between the open and closed positions;

the flow control member having an end plate positioned to close the cage at the upstream end;

the flow control member forming a cavity upstream of the end plate such the end plate prevents fluid communication between the cage and the cavity until erosion at a central wear portion of the end plate caused from turbulent flow of fluid in the cage wears through the end plate to permit fluid from the cage to enter the cavity; and a transmitter positioned in the cavity to transmit a first signal indicative of intact flow trim when there is no fluid in the cavity and to transmit a second signal indicative of eroded flow trim when fluid enters the cavity.

2. The valve of claim 1, wherein the end plate is formed with a reduced thickness portion aligned with the cavity for selective erosion in the reduced thickness portion.

3. The valve of claim 2, wherein the inlet bore and the outlet bore are configured to intersect substantially at a right angle within the flow trim, and the main bore is an extension of the outlet bore.

4. The valve of claim 3, wherein the end plate is concave facing the outlet to form the reduced thickness portion aligned with a centre axis of the outlet bore.

5. The valve of claim 4, further comprising a back plate at the reduced thickness portion, the back plate being positioned between the end plate and the cavity and being formed with an aperture aligned with the centre axis of the outlet bore to permit fluid from the cage to enter the cavity through the eroded reduced thickness portion of the end plate and through the aperture of the back plate.

6. The valve of claim 5, wherein some or all of the one or more flow ports of the cage are formed at an angle to a centre axis of the inlet bore such that the flow from the inlet bore is directed angularly toward the reduced thickness portion of the end plate and away from the outlet bore to preferentially wear at the reduced thickness portion of the end plate and to reduce erosion at the outlet bore.

7. The valve of claim 6, wherein the angle is between about 10 and 60, or between about 10 and 45, or between about 15 and 25, degrees from the centre axis of the inlet bore.

8. The valve of claim 7, further comprising a transceiver positioned on or proximate the valve to receive the first and second signals from the transmitter and to transmit a communication signal based on the received transmitter signals indicative of the state of the flow trim to an operator located remotely from the valve.

9. The valve of claim 8, wherein the flow control member is an internal plug, and wherein the end plate is positioned at an end of the plug facing the outlet bore.

10. The valve of claim 8, wherein the flow control member is an external cylindrical flow collar adapted for sliding movement along the side wall of the cage external of the cage, the flow collar forming a bore and being closed an upstream end by the end plate such that a flow collar chamber is formed in the bore of the external flow collar.

11. The valve of claim 10, wherein the transmitter is a proximity beacon, or a sensor to sense pressure or fluid in the cavity, and wherein the transmitter transmits the first and second signals to the transceiver via wires or wireless.

12. The valve of claim 11, wherein the transmitter is a switching device or a pressure transducer which senses increased pressure when fluid enters the cavity to generate the second signal indicative of the increased pressure.

13. The valve of claim 11, wherein the transmitter is the proximity beacon, and the beacon is adapted to short or cease transmitting once fluid enters the cavity so that the second signal is zero value signal or no signal which is transmitted wirelessly to the transceiver to indicate eroded flow trim.

14. The valve of claim 13, wherein the transceiver is adapted to transmit additional data in the communication signal, wherein the data may include one or more of identification, location, vibration, and battery life of the valve, the transmitter or the transceiver, and wherein the transceiver may transmit the communication signal via satellite to the one or more of the remote locations.

15. The valve of claim 14, wherein:
the flow collar includes an inner liner formed of a hardened wear material
the end plate forms part of the inner liner, and is formed from the hardened wear material;
the cage is formed from the hardened wear material;
the end plate may be formed from a less hard grade of the hardened material; and
the hardened material is preferably tungsten carbide.

16. The valve of claim 15, wherein the one or more flow ports are arranged to include one or more pairs of diametrically opposed main flow ports and the main flow ports are formed at an angle to the centre axis of inlet bore axis such that the flow from the inlet bore is directed angularly into the flow collar chamber and away from the outlet bore to encourage wear at the reduced thickness portion of the end plate and to reduce erosion at the outlet bore, and wherein the angle is between about 10 and 60, or between about 10 and 45, or between about 15 and 25, degrees from the centre axis of the inlet bore.

17. The valve of claim 16, wherein there is one pair of diametrically opposed main flow ports.

18. The valve of claim 17, which further comprises a tubular sleeve positioned in the main bore across the inlet bore and forming at least one side port communicating with the inlet bore, the flow trim being positioned within the tubular sleeve, and wherein the bonnet closes the upper end of both the valve body and the tubular sleeve.

19. The valve of claim 18, wherein the at least one side port is aligned with the inlet bore, and one pair of the one or more pairs of the diametrically opposed main flow ports is arranged such that a line through a midpoint of the diametrically opposed main flow ports is parallel to the centre axis of the inlet bore.

20. The valve of claim 19, further comprising:
at least a pair of diametrically opposed secondary flow ports formed in the side wall of the cage, the secondary flow ports having a smaller diameter than a diameter of the main flow ports and each pair of secondary flow ports being positioned with an axis which is offset by 90° from the axis of one of the pairs of main flow ports and closer to the outlet bore than are the main flow ports, and wherein the secondary ports may be formed at an angle to the centre axis of the inlet bore such that the flow from the inlet bore is directed angularly into the flow collar chamber and away from the outlet bore to encourage wear at the reduced thickness portion of the end plate and to reduce erosion at the outlet bore, and wherein the angle is between about 10 and 60, or between about 10 and 45, or between about 15 and 25, degrees from the centre axis of the inlet bore.

21. The valve of claim 20, wherein the valve is adapted for subsea use below a surface station, wherein:
the inlet bore and the outlet bore are arranged in a T-shape between the inlet and the outlet forming an insert chamber at the intersection of the inlet bore and the outlet bore; and
the tubular sleeve and the flow trim are arranged as a removable insert assembly positioned in the insert chamber, the insert assembly comprising:
(i) the tubular sleeve being adapted as a tubular cartridge having a side wall forming an internal bore and the at least one side port communicating with the inlet, whereby fluid may enter through the at least one side port from the inlet;
(ii) the flow trim being positioned in the cartridge internal bore, the flow trim comprising the tubular cage aligned with the outlet, and an external flow collar slidable along the side wall of the cage, the cage side wall forming the one or more pairs of diametrically opposed main flow ports located to overlap the intersection of the axes of the inlet bore and the outlet bore and aligned with the at least one side port of the tubular cartridge to communicate with the side port, whereby fluid from the inlet may enter the cage bore at reduced pressure and exit through the outlet;
(iii) the bonnet being disengagably connected with, and closing, the upper end of the tubular cartridge and the body; and
(iv) the stem being adapted for biassing the flow collar over the main flow ports, and wherein the transceiver is adapted to transmit the communication signal to the operator located at a sea surface via an umbilical or via an ROV.

22. A method of signalling erosion of a flow trim in a cage valve, wherein the cage valve has an inlet, an outlet, an inlet bore and an outlet bore, with the flow trim positioned in a main bore at an intersection of the inlet bore and the outlet bore, the flow trim including a stationary tubular cage and a flow control member sliding internally or externally of the cage over one or more ports formed in a side wall of the cage to control fluid flow through the cage valve, the method comprising:
providing an end plate on the flow control member such that the end plate closes the upstream end of a cage opposite the outlet;
providing a cavity in the flow control member upstream of the end plate such that the end plate prevents fluid communication between the cage and the cavity until erosion at a central wear portion of the end plate caused by turbulent flow of fluid entering the cage wears through the end plate to permit fluid from the cage to enter the cavity; and
providing a transmitter in the cavity to transmit a first signal indicative of intact flow trim when there is no fluid in the cavity and to transmit a second signal indicative of eroded flow trim when fluid enters the cavity.

23. The method of claim 22, which further comprises directing flow through the valve such that fluid entering the cage component is directed toward the central wear portion of the end plate.

24. The method of claim 23, wherein the valve is of a type having a fluid flow path extending therethrough which is to be restricted or closed, a hollow valve body assembly with the inlet bore and the outlet bore intersecting substantially at a right angle within the flow trim, and a main bore which is an extension of the outlet bore and which communicates with the inlet bore; the flow trim being positioned in the main bore, the flow control member of the flow trim comprising an external flow collar sliding along the side wall of the cage, the cage side wall forming an internal bore aligned with the outlet bore and having a ported portion between its ends formed with the one or more flow ports, the flow collar being located for movement between a closed position wherein the one or more flow ports are fully covered by the flow collar and an open position wherein each of the flow ports is fully or partially uncovered by the flow collar, whereby fluid may enter the valve through the inlet bore, pass through the one or more flow ports at reduced pressure and continue through the outlet bore, the flow collar forming a bore and being closed at an upstream end by the end plate to form a flow collar chamber in the bore of the flow collar; a bonnet disengagably connected with, and closing, an upper end of the valve body; and a stem for biassing the flow collar over the flow ports between the open and closed positions, the method further comprising:
forming the end plate with a reduced thickness portion aligned with the cavity for selective erosion in the reduced thickness portion.

25. The method of claim 24, wherein the end plate is formed to be concave facing the flow collar chamber to form the reduced thickness portion aligned with a centre axis of the outlet bore.

26. The method of claim 25, further comprising providing a back plate at the reduced thickness portion, the back plate being positioned between the end plate and the cavity and being formed with an aperture aligned with the centre axis of the outlet bore to permit fluid from the cage to enter the cavity through the eroded reduced thickness portion of the end plate and through the aperture of the back plate.

27. The method of claim 25, wherein some or all of the one or more flow ports of the cage are formed at an angle to a centre axis of the inlet bore such that the flow from the inlet bore is directed angularly toward the reduced thickness portion of the end plate and away from the outlet bore to cause preferential wear at the reduced thickness portion of the end plate and to reduce erosion at the outlet bore.

28. The method of claim 27, wherein the angle is between about 10 and 60, or between about 10 and 45, or between about 15 and 25, degrees from the centre axis of the inlet bore.

29. The method of claim 28, further comprising providing a transceiver positioned on or proximate the valve to receive the first and second signals from the transmitter and to transmit a communication signal based on the received transmitter signals indicative of the state of the flow trim to an operator located remotely from the valve.

30. The method of claim 29, wherein the transmitter is a proximity beacon, or a sensor to sense pressure or fluid in the cavity, and wherein the transmitter transmits the first and second signals to the transceiver via wires or wireless.

31. The method of claim 29, wherein the transmitter is a switching device or a pressure transducer which senses increased pressure when fluid enters the cavity to generate the second signal indicative of the increased pressure.

32. The method of claim 29, wherein the transmitter is the proximity beacon, and the beacon is adapted to short or cease transmitting once fluid enters the cavity so that the second signal is zero value signal or no signal which is transmitted wirelessly to the transceiver to indicate eroded flow trim.

33. The method of claim 32, wherein the transceiver transmits additional data in the communication signal, wherein the data may include one or more of identification, location, vibration and battery life of the valve, the transmitter or the transceiver, and wherein the transceiver may transmit the communication signal via satellite to the one or more of the remote locations.

34. The method of claim 33, wherein:
the flow collar includes an inner liner formed of a hardened wear material
the end plate forms part of the inner liner, and is formed from the hardened wear material;
the cage is formed from the hardened wear material;
the end plate may be formed from a less hard grade of the hardened material; and
the hardened material is preferably tungsten carbide.

\* \* \* \* \*